United States Patent [19]
Vlnaty

[11] 3,908,970
[45] Sept. 30, 1975

[54] METHOD AND APPARATUS FOR CARBONIZING AND DESULFURIZING COAL-IRON COMPACTS

[75] Inventor: Joseph Vlnaty, Aliquippa, Pa.

[73] Assignee: Dravo Corporation, Pittsburgh, Pa.

[22] Filed: Aug. 9, 1973

[21] Appl. No.: 387,017

Related U.S. Application Data

[60] Division of Ser. No. 101,990, Dec. 28, 1970, Pat. No. 3,753,683, Continuation-in-part of Ser. No. 49,660, June 25, 1970, abandoned.

[52] U.S. Cl. .............................................. 266/20
[51] Int. Cl.² .......................................... F27B 1/08
[58] Field of Search ............................. 75/1, 3, 4; 266/15–17, 19, 20, 24; 201/17, 20

[56] References Cited
UNITED STATES PATENTS

| 2,824,047 | 2/1958 | Gorin et al. | 201/17 X |
| 3,481,834 | 12/1969 | Squires | 201/20 X |
| 3,585,023 | 6/1971 | Vlnaty et al. | 75/37 X |
| 3,635,456 | 1/1972 | Anthes et al. | 266/19 |
| 3,776,533 | 12/1973 | Vlnaty | 266/24 |

*Primary Examiner*—Gerald A. Dost
*Attorney, Agent, or Firm*—Parmelee, Miller, Welsh & Kratz

[57] ABSTRACT

Method and apparatus for preparing compacts of an iron and carbonized coal having a low sulfur content. Coal and iron oxide or metallic iron are formed into compacts, heated, and contacted within an enclosed reactor with a gas containing elemental hydrogen. Hydrogen sulfide is formed by reaction of the hydrogen with sulfur in the compacts and off-gasses are formed from this reaction and from carbonization of the coal. The hydrogen sulfide is separated from the off gases and a portion of the off gases returned to the enclosed reactor. Desulfurized compacts are discharged from the reactor and contain carbonized coal and iron metal, the compacts being low in sulfur content and especially useful in metallurgical processing.

3 Claims, 2 Drawing Figures

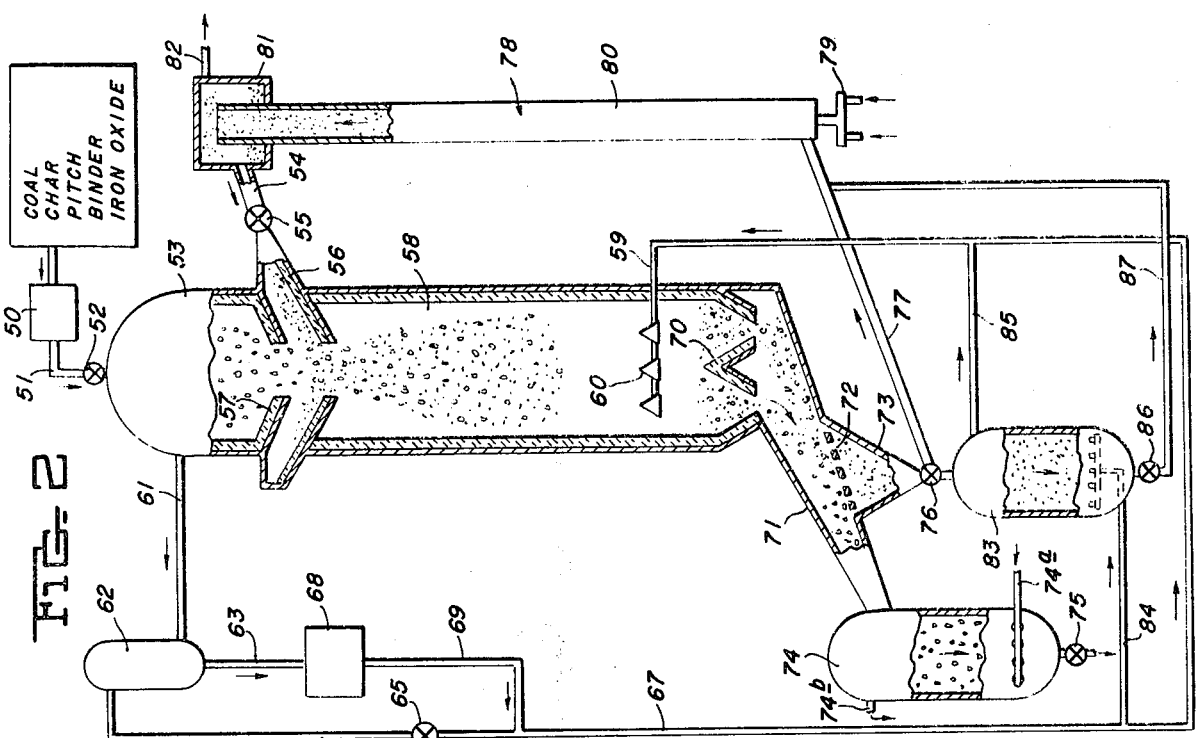
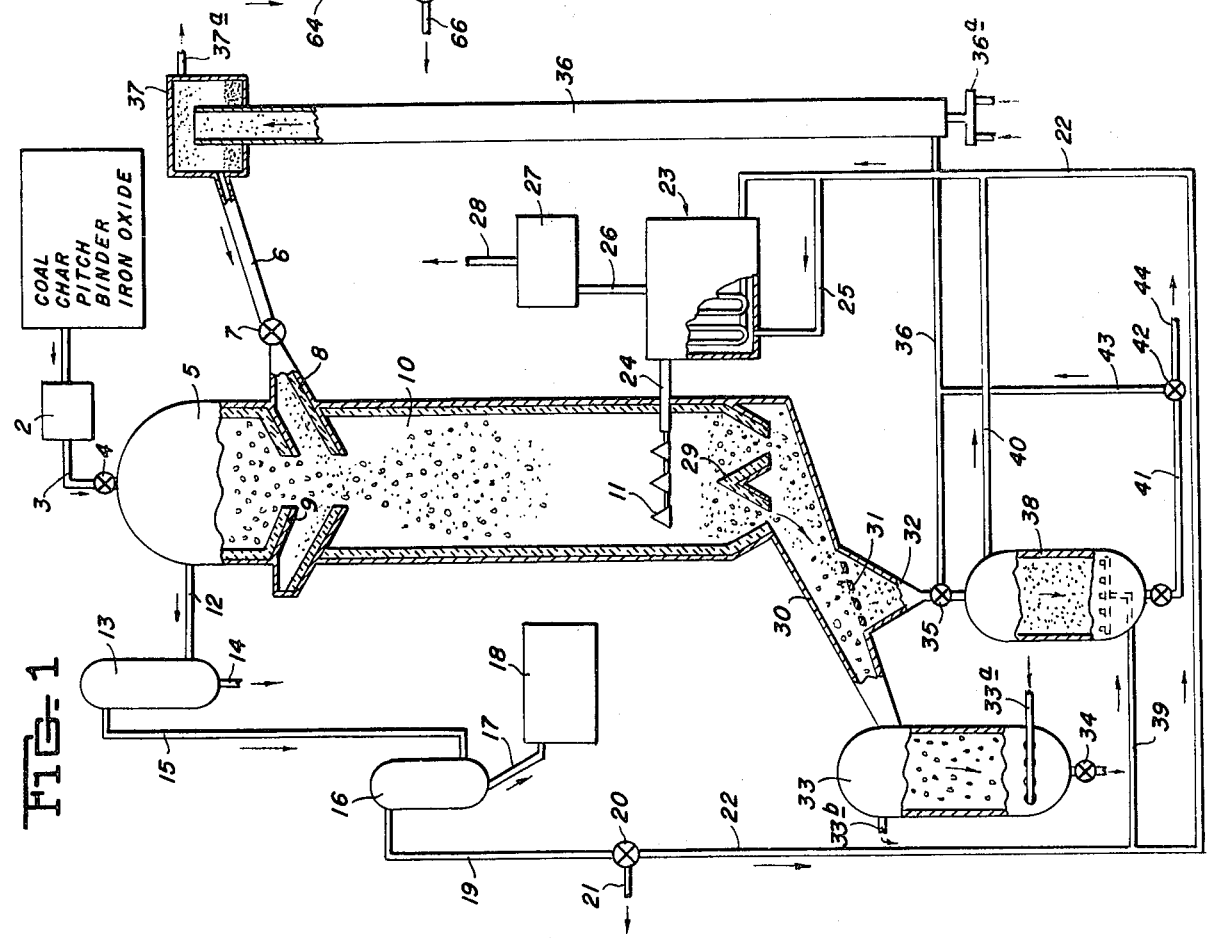

METHOD AND APPARATUS FOR CARBONIZING AND DESULFURIZING COAL-IRON COMPACTS

REFERENCE TO RELATED APPLICATION

This is a divisional of application Ser. No. 101,990, filed Dec. 28, 1970 now U.S. Pat. No. 3,753,683 dated Aug. 21, 1973, is a continuation-in-part of my copending application Ser. No. 49,660, filed June 25, 1970, and now abandoned and entitled "Process for Making Low-Sulfur-Content Solid Carbonaceous Products".

BACKGROUND OF THE INVENTION

1. Field of the Invention

The present invention provides a method and apparatus for carbonizing and desulfurizing coal-iron compacts to produce low-sulfur-content carbonized compacts of coal char and iron for use in producing iron.

2. Prior Art

As described in my above-entitled copending application, the reserves of low-sulfur coal are declining, while the need for such coal in general use and in iron production is growing due to the attack upon atmospheric pollution and iron contamination caused by the use of coals having high sulfur content.

The use of coals which contain sulfur in the reduction of iron ore, where the coal, or coke formed therefrom, are used as fuel and source of reductants, results in an excess of sulfur in the pig iron. Even where high quality coke is used, sulfur is a problem because of the fact that coking does not remove all of the sulfur from the coal. Thus, unless low-sulfur content coal is used in coke production, the supply of which coal is being depleted, special treatment of coal is required in order to remove sufficient sulfur therefrom to render the same usable in iron production. A process for desulfurizing coal is disclosed in U.S. Pat. No. 2,824,047 wherein powdered coal is mixed with about an equal amount of a solid sulfur acceptor and the mixture heated in the presence of hydrogen gas. As far as I am aware, however, this process has not achieved success in desulfurizing of compacts for metallurgical processing.

The present invention is directed to the carbonization and desulfurization of compacts formed from coal and an iron oxide or iron metal to produce a carbonaceous product suitable for metallurgical processes. The sulfur and combustion gases formed are also salable items.

BRIEF SUMMARY OF THE INVENTION

Compacts of conventional coals, containing more than about one percent sulfur, and iron oxides or iron metal are carbonized and desulfurized by heating the compacts to a temperature in the range of about 1200°–1800°F in an enclosed reactor, preferably by enveloping the compacts in a highly heated solid heat carrier, and contacting the heated compacts with a gas containing elemental hydrogen. The hydrogen reacts with sulfur in the compacts to produce hydrogen sulfide, while the heated coal is being carbonized and releases carbonization off-gases. The hydrogen sulfide is removed from the off gases either by exhausting both from the reactor followed by conventional separation, or by using as the solid heat carrier a solid which acts as a sulfur acceptor to remove the hydrogen sulfide from the off-gases while in the enclosed reactor, which acceptor is regenerated outside the reactor to release sulfur. This regenerated acceptor is then reheated and returned to the reactor. The off-gases which comprise mainly reducing gases and which are highly combustible can be used as a fuel, after the separation of the hydrogen sulfide therefrom, while a portion thereof may be returned to the reactor. The carbonized and desulfurized compacts are separated from the solid heat carrier and cooled to provide valuable low-sulfur content carbonized coal compacts containing metallic iron and are especially suitable for use in the production of iron in a blast furnace.

BRIEF DESCRIPTION OF THE DRAWINGS

FIG. 1 schematically illustrates the present process and an apparatus for carrying out the process where an inert solid medium is used to heat the compacts to carbonization and desulfurization temperatures, and FIG. 2 illustrates schematically the process and apparatus wherein the solid heat carrier also acts as a sulfur acceptor in the carbonization and desulfurization process.

DETAILED DESCRIPTION

Conventional coals having a sulfur content in excess of about 1 percent by weight are generally not usable in iron producing processes unless mixed in varying degrees with very low sulfur content coals to give a coal supply having an over-all sulfur content of about 1 percent or less. It is coal of this type, medium or high sulfur content coals, which is used to form compacts in the present invention, and which compacts are carbonized and desulfurized to give compacts usable in iron production. The coals are crushed and finely divided particles formed such as those which are conventionally used in compact formation. The term compact as used herein relates to both briquettes which may be as large as about 2 – 2½ inches in cross-section and pellets which are normally on the order of three quarters of an inch to 2 inches in diameter.

The sulfur-containing coal, in finely divided form, is mixed with about 1–30 percent by weight of an iron oxide such as a natural ore (magnetite, hematite and the like), or an iron oxide conentrate such as that recovered from flue dusts of a basic oxygen furnace. Powdered iron metal can be used in place of the oxides but is more expensive than the above. Iron oxides will therefore be used in the following description although it is to be understood that metallic iron is usable. The use of more than about thirty percent iron oxide results in excessive consumption of the coal through reduction of the oxide, while less than about one percent iron oxide is insufficient to remove the sulfur from the coal. As in conventional briquetting or pelletizing processes, a binder such as a coal tar pitch is added if desired. In pelletizing the coal-iron oxide mixture, generally about 8–14% water is added and the mixture rolled into pellets in a ball or disc pelletizer.

As illustrated in FIG. 1, the compacts are formed in a conventional compactor 2 and charged through a conduit 3 into an enclosed reactor such as a refractory-lined steel reactor 5 by means of a star valve or other feed control means 4.

Also charged to the reactor 5 is a supply of highly-heated inert solid material which is charged from a conduit 6 through a feed control means 7 into a distributing ring or other distributing means 8 which, in conjunction with deflectors 9, within the reactor, provides for envelopment of the compacts within the highly heated inert solid material. The mixture then descends by gravity into the desulfurization and carbonization zone 10 of the reactor 5. In the zone 10 of the reactor, the mixture of inert solids and compacts is contacted with an upward flow of gases containing elemental hydrogen which is introduced into the reactor through gas inlets 11. The sulfur-containing coal-iron oxide compacts are heated to a temperature of about 1200°–1800°F by enveloping them in the highly heated solids and the coal carbonized with the evolution of off-gases containing tars, oils and reducing gases, while the hydrogen reacts with sulfur in the compacts to produce hydrogen sulfide. Some hydrogen at these temperatures, will also reduce the iron oxide. The carbonization off-gases and hydrogen sulfide pass upwardly in the reactor 5 and are exhausted through exhaust line 12. From exhaust line 12, the off-gases and hydrogen sulfide mixture is cooled in a condenser 13 which condenses oils and tars resulting from the carbonization of the coal, the condensate being discharged through discharge line 14 for recovery. After condensation of oils and tars therefrom the off-gas and hydrogen sulfide mixture is carried by line 15 to a conventional hydrogen sulfide recovery unit 16. Such recovery units are well known in the art and separate gaseous hydrogen sulfide from a gaseous stream. The gaseous hydrogen sulfide is led by line 17 to a conventional unit 18 which converts the hydrogen sulfide to sulfur such as by well known conventional methods.

The carbonization off-gas stream, after removal of the oils, tars and hydrogen sulfide, is carried by line 19 to a distributing valve 20. The off-gas stream, containing mainly reduction gases such as hydrogen, hydrocarbons, carbon monoxide and the like from the coal, is highly combustible and a portion thereof can be discharged by means of valve 20 through line 21 for use at other on-plant or off-plant sites. The remaining gas is introduced into line 22 for return to the reactor 5. The gas is led through a preheater 23 and then to line 24 from which it is introduced into the reactor 5 to act as a hydrogen source for further carbonization and desulfurization of coal-iron oxide compacts. If desired, a portion of the gas stream from line 22 may be diverted through line 25 and burned to provide a heat source for preheater 23, from which the exhaust is led by line 26 to a heat recuperator 27 and finally discharged by means of discharge line 28.

The contact between the hydrogen-containing gas introduced through inlets 11 and the coal-iron oxide compacts, as described in detail in my above mentioned co-pending application which is assigned to the assignee of the instant application, provides for reaction between the hydrogen and sulfur in the compacts at the elevated temperature.

After sufficient contact in the carbonization and desulfurization zone 10, the carbonized and desulfurized compacts pass by gravity over a distributor 29 and then to a discharge chute 30. A grate 31 is positioned in discharge chute 30, so as to allow the finely divided particles of heat carrier to pass therethrough, into a discharge hopper 32, while the carbonized and desulfurized compacts are introduced into a cooler 33. The compacts are then cooled in a non-oxidizing atmosphere such as by contact with a non-oxidizing gas, such as off-gases, introduced through inlet 33a and exhausted through outlet 33b of the cooler 33. The cooled compacts are then discharged for use, through a star wheel or other discharge device 34.

The finely divided heat carrier, after passage through grate 31 is collected in a hopper 32 and discharged therefrom through a valve 35 to line 36 or if desired into a heating chamber 38. Solids introduced into line 36 are reheated and returned to a storage chamber 37 from which highly heated solids are returned to line 6 for reintroduction into the reactor 5. The reheating of the solids may be carried out in a conventional air lift furnace, with hot combustion gases being introduced through inlets 36a to carry the solids, while heating them, up column 36, the gases being exhausted through line 37a. If it is desired that the heat carrier be used to heat incoming gases to the reactor 5, the heat carrier is transferred from the hopper 32, by means of valve 35 into a chamber 38 for passage therethrough. As the solids descend through chamber 38, gases from line 22 are diverted through line 39 into the bottom portion of the chamber 38 for upward passage through the chamber. This countercurrent flow of the gases through the mass of hot solids heats the gases which are discharged hot from the chamber through line 40 and returned to line 22 for subsequent introduction into the reactor 5 as above described. The solids, after discharge from chamber 38, are carried by line 41 to a valve 42. From valve 42, the solids may either be transferred by line 43 to line 36 for reheating and re-use, or if they are expendable, the solids may merely be discharged through line 44 for discarding.

In the embodiment illustrated in FIG. 2, the solid heat carrier used to envelop and heat the conpacts within the reactor is also used as an acceptor to remove hydrogen sulfide formed during the desulfurization and carbonization. The hydrogen sulfide is thus removed from the gaseous media within the reactor with exhaust gases usable as fuel without the presence of gaseous sulfur impurities which would be released to the atmosphere on combustion of the fuel. As illustrated, compacts are conventionally formed in a compactor 50 and introduced by line 51 and star wheel or other feed device 52 into reactor 53. The compacts descend in the reactor and are enveloped within hot solid sulfur acceptor, introduced through line 54 by a star wheel 55, by distribution ring 56 and deflectors 57. The sulfur acceptor, compounds which remain solid at the temperature used within the reactor and which, in solid form reacts with hydrogen sulfide present in a gaseous stream, may comprise lime, bruned dolomite, basic metallurgical slags and the like. The acceptor is a compound which will react with the hydrogen sulfide to remove sulfur therefrom but is not reducible by hydrogen under the conditions used in the decarbonization and desulfurization of the compacts. The acceptor is highly heated and envelopes the compacts within the reactor. As the mixture of compacts and solid acceptor descends through the carbonization zone 58 of the reactor, a gas containing elemental hydrogen is introduced into the reactor by means of line 59 through parts 60 and flows countercurrent to the descending mixture. Contact of the gas containing elemental hydrogen with the compacts, at a temperature of 1200°–1800°F, removes sulfur from the compacts, forming hydrogen sulfide. The hydrogen sulfide so-formed is then in contact with the solid sulfur acceptor in the mixture, which acceptor removes the sulfur to provide additional hydrogen for contact with the compacts. The hydrogen sulfide is thus removed form the carbonization and desulfurization off-gases, which gases are exhausted from the reactor 53 through exhaust line 61. From line 61, the off-gases are passed through a condenser 62 to remove tars and oils therefrom. The condensed tars and oils are discharged through line 63. The off-gases, after removal of tars and oils are carried by line 64 to a distributing valve 65. These gases are high in BTU content and a portion thereof is exhausted through line 66 for use as a fuel, with the remainder returned to the reactor 58 by means of line 67. The tars and oils, which were liquefied in condenser 62 and discharged therefrom through line 63 may be subjected to hydrothermal cracking or other processing in a conventional unit 68 to produce additional gases containing elemental hydrogen, which gases can be introduced into line 67 by means of line 69.

The mixture of compacts and solid acceptor, after sufficient time in the carbonization zone 58 to reduce the sulfur content of the compacts to a desired predetermined lever, descends over a distributor 70 to a discharge chute 71 at the bottom portion of the reactor. A grate 72 is positioned in the discharge chute 71 and is so arranged that the solid acceptor passes through the grate 72 into a hopper 73, while the carbonized and desulfurized compacts pass to a cooler 74. The compacts may be cooled by contact with a non-oxidizing gas introduced through inlet 74a and exhausted through outlet 74b. The cooled compacts are discharged from the cooler through a valve 75 for use.

The acceptor that passes through grate 72 into hopper 73, which acceptor has become sulfided through reaction with hydrogenn sulfide during the carbonization and dusulfurization of the compacts, is discharged from the hopper through a star wheel or other discharge means 76. This sulfided acceptor may be used to preheat gases fed to the reactor 53 or may be directly processed for regeneration. For direct regeneration, the sulfided acceptor is introduced through the valve 76 into line 77 to an air lift furnace 78. In the air lift furnace, hot air, from a source not shown, is introduced through inlet 79 and while carrying the sulfided acceptor upwardly through conduit 80 of the air lift furnace. During the elevation of the sulfided acceptor, the hot air oxidizes the spend acceptor and produces sulfur dioxide while heating and regenerating the acceptor. The heated regenerated acceptor is carried to a storage chamber 81 where it is collected for recycling to the reactor 53 through line 54. The sulfur dioxide and any other off-gases are exhausted from the chamber 81 through line 82 and are treated by conventional processes so as to recover the sulfur which is a salable item.

If it is desired to use the hot sulfided acceptor as a heat source to preheat gases fed to the reactor 53, the acceptor is charged by valve 76, from hopper 73, into a heating chamber 83. As the hot sulfided acceptor descends through the chamber 83, gases from line 67 are diverted through line 84 into the bottom portion of the chamber 83 and are directed upwardly through the descending hot acceptor. The gases, heated by contact with the acceptor, are exhausted through line 85 and led to line 67 for introduction into line 59 and then into the reactor 53. The sulfided acceptor, after heating the counter-current gases in chamber 83 are discharged through a star wheel or other means 86 and are carried through line 87 to line 77 for introduction to the air lift furnace 78 for reheating and regeneration as described above.

There has been described a process and apparatus for desulfurizing and carbonizing coal-iron compacts, which compacts are excellently suited for use in producing low-sulfur iron. The process is efficient and economical and provides a substitute for natural low-sulfur coal or coke generally used in producing iron, the supplies of which are dwindling in the industrial sections of the country.

I claim:

1. An apparatus for producing low-sulfur content compacts of iron and carbonized coal from finely-divided sulfur-containing particles of coal and iron particles selected from iron powder and iron oxides comprising:
   a. means for forming compacts of said iron particles and particles of sulfur-containing coals,
   b. an enclosed reactor having:
      1. means for charging compacts of said iron particles and sulfur-containing coal into one end and means for discharging carbonized and desulfurized compacts from the other end thereof,
      2. means adjacent said one end for introducing a highly heated solid particulate material into the enclosed reactor and admixing the same with compacts therein to carbonize the compacts and form carbonization off-gases,
      3. means adjacent said other end for introducing a hydrogen containing gas for countercurrent flow relative to the compacts in said enclosure whereby some of the hydrogen reacts with sulfur in the coal to form hydrogen sulfide in admixture with carbonization off-gases,
      4. means adjacent said one end for exhausting said admixture of gases from the enclosure following contact with the compacts,
   c. means adjacent the said other end for discharging the carbonizing and desulfurized compacts comprising means for separating the compacts and solid particulate material,
   d. means for separating hydrogen sulfide from said admixture of gases, and
   e. means for recycling a portion of carbonization off-gases, from which hydrogen sulfide has been separated, to said means for introducing a hydrogen-containing gas at the said other end of the reactor, including means for heating said portion of off-gases prior to recycling the said portion of off-gases to said means for introducing a hydrogen containing gas to the reactor, so that the heated portion of off-gases travels countercurrent to the heated solid particulate material and the compacts, said means for heating said portion of off-gases comprising a chamber into which, and through which, the still hot, solid particulate material passes after the discharge of the compacts and solid particulate material from the reactor and the separation of the compacts and the solid particulate material through which the portion of off-gases are circulated in contact with the solid particulate material to effect the heating of said portion of off-gases.

2. An apparatus as defined in claim 1 wherein said means for separating hydrogen sulfide from the carbonization gases also constitutes the means for introducing highly-heated solid particulate material into the reactor and the said particulate material comprises the sulfur acceptor.

3. An apparatus as defined in claim 2 including means for contacting said solid particulate material after discharge of the compacts and solid particulate material from the reactor and separation of the compacts from the solid particulate material with a flow of heated air and combustion products.

* * * * *